United States Patent Office 3,783,130
Patented Jan. 1, 1974

3,783,130
SOLID LUBRICANTS
Marcel Torre, Geneva, Switzerland, assignor to
Mefina S.A., Fribourg, Switzerland
No Drawing. Filed Feb. 19, 1971, Ser. No. 117,048
Claims priority, application Switzerland, Feb. 27, 1970, 2,884/70
Int. Cl. C10m 7/02, 7/06
U.S. Cl. 252—12                                 4 Claims

ABSTRACT OF THE DISCLOSURE

A solid lubricant is formed of a mixture comprising one part by weight of hexagonal boron nitride to three parts by weight of sulfur. A finely divided powder of the boron nitride is dispersed in liquid sulfur between the melting point and 160° C., or between 360° C. and the boiling point of sulfur. The mixture, in the liquid or pasty state, can be applied to a material with a surface having retentive properties, and allowed to cool to form a lubricating layer.

---

Numerous solid products with lubricating properties are already known and are commonly used for the lubrification of parts or members of machines subject to sliding or rolling friction.

Solid lubricating products of known types comprise notably: salts of stearic acid and other soaps; graphite in different forms; sulfur and sulfates and, in particular, molybdenum bi-sulfate; fluorised compounds and fluorides including carbon monofluoride; certain metals such as tin, antimony, copper and their alloys usable in powder form or applicable in layers; paraffin; boron nitride with hexagonal crystals; talcum.

Such solid lubricants can be used in the form of elements applied to or embedded in the metallic part submitted to friction. They can also be applied, by various processes, in the form of films forming a protective layer preventing direct metallic contact of the sliding surfaces.

However, known solid lubricants do not always enable perfectly adherent layers with a long life to be obtained on metallic surfaces. One known process for obtaining a lubricating layer consists of reacting a film of molybdenum deposited by evaporation under vacuum, either with compounds including sulfur, or in a sulfurated atmosphere, in a manner to obtain a film of molybdenum sulfide. Such processes are generally very costly.

In the case where strict cleanliness is required, boron nitride which has the advantage of not blackening is preferably used.

The invention aims to provide a solid product with improved lubricating properties and capable of being used to impregnate metals or sintered alloys and to form adhering layers on metallic surfaces.

According to the invention, a solid product with lubricating propetries is formed of a mixture comprising hexagonal boron nitride and sulfur as a support agent.

The invention also concerns a process for manufacturing the said solid product with lubricating properties, in which a finely divided powder of hexagonal boron nitride is dispersed in liquid sulfur at a temperature comprised between the melting point and 160° C. or between 360° C. and the boiling point, and allowed to cool.

An example of preparation of the solid lubricating product according to the invention will now be described.

Hexagonal boron nitride is dispersed in the finely powdered state in liquid sulfur. One part by weight of boron nitride is used for three parts by weight of sulfur.

The sulfur ($S_8$) which is orthorhombic under normal conditions ($\alpha$ sulfur), is transformed into clinohombic (monoclinic) ($\beta$ sulfur) at approximately 95° C. at atmospheric pressure. The $\beta$ sulfur melts at about 119° C. Liquid sulfur is formed of two types: $\lambda$ sulfur ($S_8$) which is clear yellow and very fluid, and $\mu$ sulfur ($S_6$) which is red-brown and very viscous. At the melting point, the $\lambda$ type is dominant (only about 3% of $\mu$ sulfur). By increasing the temperature, the $\lambda$ sulfur is transformed into $\mu$ sulfur. The viscosity of sulfur which is 11 centipoise at the melting point, passes a minimum value 7 cp. at about 150° C. to reach over 20,000 cp. at about 200° C.; at 400° C., the sulfur is once more very fluid (boiling point at 444.6° C.). Moreover, sulfur at 120° C. has a lesser surface tension than water (60.9 dynes/cm. under vacuum).

Sulfur thus has a low surface tension and low viscosity between its melting point and about 160° C. and between 360° C. and its boiling point. In sulfur in these temperature ranges, it is possible to make a dispersion of one boron nitride still in the solid state at the temperatures in question.

Pure sulfur, when it cools, solidifies in large transparent crystals of $\beta$ sulfur (density 1.96) which, left at ambient temperature become, in several days, opaque and friable, each one having decomposed into a multitude of small crystals of $\alpha$ sulfur with a density of 2.06.

In the proportions used (1 part of boron nitride for 3 parts of sulfur), it is observed that each grain of boron nitride powder is correctly coated with liquid sulfur. Such a mixture, when it cools, solidifies into microscopic crystals, each grain of boron nitride serving as a center of crystallization, the mixture conserving its hardness, without cracking or shrinking at ambient temperature.

It is observed that the material obtained has better lubricating properties than those of its constituents. This material can be poured into molds or worked for the manufacture of any parts which must have auto-lubricating properties. The material obtained can be applied onto a material having a surface with retentive properties, that is to say a surface having interstices of rugosity. It is thus convenient to impregnate sintered metallic parts such as, for example, bearings by immersion of these parts in the material in the liquid state. Because of the low surface tension of the material, it infiltrates easily into the pores of the sintered part. There is formed at the surface of such a part a film of solid lubricating material. A use of this type proves advantageous in all cases where it is impossible, because of the operating conditions, to form a continuous film of liquid lubricant.

Additionally, the material in liquid or pasty form can be applied onto the surface of anodically oxidized or sanded metals. The material solidifies and forms a layer having a very good adherance and excellent lubricating properties.

The material obtained is also suitable for the impregnation of materials such as wood or plastics materials. It can be applied for example on articles such as skis or certain furniture elements, for example drawers, which must have good sliding properties.

It should be remarked that in the case of heating of the part in use (for temperatures above 120° C.), the sulfur contained in the mixture becomes liquid and distributes uniformly over the surface, which increases the lubricating properties of the material.

I claim:
1. A solid product with lubricating properties formed of a mixture consisting essentially of a minor effective lubricating amount of boron nitride and about three times that quantity of sulfur.
2. A product according to claim 1, in which the mixture includes one part by weight of boron nitride to three parts by weight of sulfur.
3. A process for manufacturing a solid product with lubricating properties consisting essentially of dispersing a finely divided powder of hexagonal boron nitride in liquid sulfur at a temperature between the melting point of sulfur and 160° C. or between 360° C. and the boiling point of sulfur and allowing the dispersion to cool to form the said solid product which is composed of a minor effective lubricating amount of boron nitride and about three times that quantity of sulfur.

4. A process according to claim 3, in which one part by weight of boron nitride is used for three parts by weight of sulfur.

References Cited

UNITED STATES PATENTS

| | | | |
|---|---|---|---|
| 208,524 | 10/1878 | Johnson | 252—12.4 |
| 2,465,051 | 3/1949 | Adams et al. | 252—12 |
| 3,384,584 | 5/1968 | Groszek | 252—31 |
| 3,379,642 | 4/1968 | Nielsen et al. | 252—12 |

FOREIGN PATENTS

| | | | |
|---|---|---|---|
| 211,716 | 2/1968 | U.S.S.R. | 252—31 |

DANIEL E. WYMAN, Primary Examiner

I. VAUGHN, Assistant Examiner

U.S. Cl. X.R.

252—31